United States Patent
Fukasawa et al.

(10) Patent No.: US 11,124,200 B2
(45) Date of Patent: Sep. 21, 2021

(54) VEHICLE CONTROL DEVICE

(71) Applicant: HITACHI AUTOMOTIVE SYSTEMS, LTD., Hitachinaka (JP)

(72) Inventors: Yoshitaka Fukasawa, Tokyo (JP); Masahito Mitsuhashi, Tokyo (JP); Takayuki Kawashima, Tokyo (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 216 days.

(21) Appl. No.: 16/344,095

(22) PCT Filed: Feb. 5, 2018

(86) PCT No.: PCT/JP2018/003742
§ 371 (c)(1),
(2) Date: Apr. 23, 2019

(87) PCT Pub. No.: WO2018/155142
PCT Pub. Date: Aug. 30, 2018

(65) Prior Publication Data
US 2019/0241194 A1 Aug. 8, 2019

(30) Foreign Application Priority Data
Feb. 21, 2017 (JP) .............................. JP2017-029744

(51) Int. Cl.
*B60W 50/02* (2012.01)
*B60W 30/16* (2020.01)
(Continued)

(52) U.S. Cl.
CPC ......... *B60W 50/0205* (2013.01); *B60R 21/00* (2013.01); *B60W 30/16* (2013.01);
(Continued)

(58) Field of Classification Search
CPC .......... B60R 21/00; B60W 2050/0077; B60W 2050/021; B60W 2050/0215;
(Continued)

(56) References Cited

U.S. PATENT DOCUMENTS 5,675,518 A * 10/1997 Kuroda ................... G01S 7/003
702/97
2004/0236484 A1 * 11/2004 Tsuchiya ................. G01P 21/00
701/33.9
(Continued)

FOREIGN PATENT DOCUMENTS

DE 102014216018 A1 2/2016
JP 08-132930 A 5/1996
(Continued)

OTHER PUBLICATIONS

Extended European Search Report dated Dec. 1, 2020 for European Patent Application No. 18757783.8.
(Continued)

*Primary Examiner* — Babar Sarwar
(74) *Attorney, Agent, or Firm* — Volpe Koenig

(57) ABSTRACT

A vehicle control device that is capable of performing abnormality determination of a sensor by majority decision without increasing the number of sensors. A vehicle control device includes a camera and a radar configured to detect a predetermined detection target; and a communication device configured to communicate with outside. The vehicle control device determines whether there is an abnormality in the camera and the radar on the basis of: first acquisition means configured to acquire information on the predetermined detection target from each of the camera and the radar; second acquisition means configured to acquire information, on the predetermined detection target, detected by a road-to-vehicle communication device external to an own vehicle and received by the communication device; information
(Continued)

from the camera and the radar acquired by the first acquisition means; and information from the road-to-vehicle communication device external to the own vehicle acquired by the second acquisition means.

6 Claims, 3 Drawing Sheets

(51) Int. Cl.
 *G08G 1/16* (2006.01)
 *B60R 21/00* (2006.01)
 *G08G 1/09* (2006.01)
(52) U.S. Cl.
 CPC .............. *B60W 50/02* (2013.01); *G08G 1/09* (2013.01); *G08G 1/16* (2013.01); *B60W 2050/021* (2013.01); *B60W 2050/0215* (2013.01); *B60W 2520/10* (2013.01); *B60W 2520/105* (2013.01); *B60W 2552/30* (2020.02); *B60W 2554/00* (2020.02); *B60W 2554/801* (2020.02); *B60W 2556/65* (2020.02)
(58) Field of Classification Search
 CPC ....... B60W 2520/10; B60W 2520/105; B60W 2552/30; B60W 2554/00; B60W 2554/801; B60W 2556/45; B60W 2556/55; B60W 2556/65; B60W 30/16; B60W 50/02; B60W 50/0205; G01S 13/91; G01S 13/931; G01S 2013/9316; G01S 7/003; G06K 9/00805; G06K 9/03; G06K 9/6293; G08G 1/0116; G08G 1/0141; G08G 1/04; G08G 1/09; G08G 1/16; H04W 4/023; H04W 4/38; H04W 4/04

See application file for complete search history.

(56) References Cited

U.S. PATENT DOCUMENTS

| | | | | |
|---|---|---|---|---|
| 2006/0241831 | A1* | 10/2006 | Watanabe | B60W 50/0205 |
| | | | | 702/185 |
| 2012/0150406 | A1* | 6/2012 | Tomura | B60W 30/18018 |
| | | | | 701/70 |
| 2014/0046532 | A1* | 2/2014 | Saito | B60W 50/0205 |
| | | | | 701/30.4 |
| 2014/0163795 | A1* | 6/2014 | Omi | B60K 6/442 |
| | | | | 701/22 |
| 2014/0368668 | A1* | 12/2014 | Sasabuchi | G01S 13/867 |
| | | | | 348/187 |
| 2016/0347251 | A1* | 12/2016 | Shigemura | G06K 9/00805 |
| 2017/0001637 | A1* | 1/2017 | Nguyen Van | G01S 13/931 |
| 2017/0345294 | A1* | 11/2017 | Hirotsu | G08G 1/08 |
| 2017/0352201 | A1* | 12/2017 | Kumabe | G07C 5/008 |

FOREIGN PATENT DOCUMENTS

| | | |
|---|---|---|
| JP | 08-285534 A | 11/1996 |
| JP | 2010-126130 A | 6/2010 |
| JP | 2016-128985 A | 7/2016 |
| WO | 2017/010264 A1 | 1/2017 |

OTHER PUBLICATIONS

International Search Report, PCT/JP2018/003742, dated May 22, 2018, 2 pgs.

* cited by examiner

INTER-VEHICLE DISTANCE

VEHICLE CONTROL DEVICE

TECHNICAL FIELD

The present invention relates to a vehicle control device that is installed in an automobile and controls a vehicle provided with a sensor to detect information between with a preceding vehicle and a surrounding road environment.

BACKGROUND ART

In automatic driving, it is necessary to continue grasping a surrounding situation. For this purpose, external recognition sensors such as a radar and a camera are used. If there is an abnormality in these sensors, there is a risk that a vehicle may be in a dangerous situation. Therefore, being able to detect an abnormality of the sensors is necessary.

Considering that a comparison object is required in order to know that a sensor installed in an own vehicle has an abnormal value, and the comparison object can also take an abnormal value, majority decision with three sensing results including itself is necessary. Conventionally, there are examples in which two sensors, such as a radar and a camera, are installed in an own vehicle (see, for example, PTL 1).

CITATION LIST

Patent Literature

PTL 1: JP H8-285534 A

SUMMARY OF INVENTION

Technical Problem

However, installing three sensors with detection targets overlapping with each other on the own vehicle has a problem of being redundant for performing automatic driving and the like, and of increasing the cost.

Accordingly, it is an object of the present invention to provide a vehicle control device capable of performing abnormality determination of a sensor by majority decision without increasing the number of sensors in a vehicle.

Solution to Problem

In order to solve the above-mentioned problem, a vehicle control device according one embodiment of the present invention is a vehicle control device for a vehicle including: a plurality of sensors configured to detect a predetermined detection target; and communication means configured to communicate with outside. The vehicle control device includes: first acquisition means configured to acquire information on the predetermined detection target from each of the plurality of sensors; second acquisition means configured to acquire information, on the predetermined detection target, detected by a device external to an own vehicle and received by the communication means; and abnormality determination means configured to determine whether or not there is an abnormality in the plurality of sensors, on the basis of information from the plurality of sensors acquired by the first acquisition means and information from the device external to the own vehicle acquired by the second acquisition means.

Advantageous Effects of Invention

According to the present invention, it is possible to provide a vehicle control device capable of performing abnormality determination of a sensor by majority decision without increasing the number of sensors in a vehicle.

DESCRIPTION OF EMBODIMENTS

Hereinafter, a vehicle control device 18 according to a first embodiment of the present invention will be described in detail with reference to the drawings.

Figure 1:
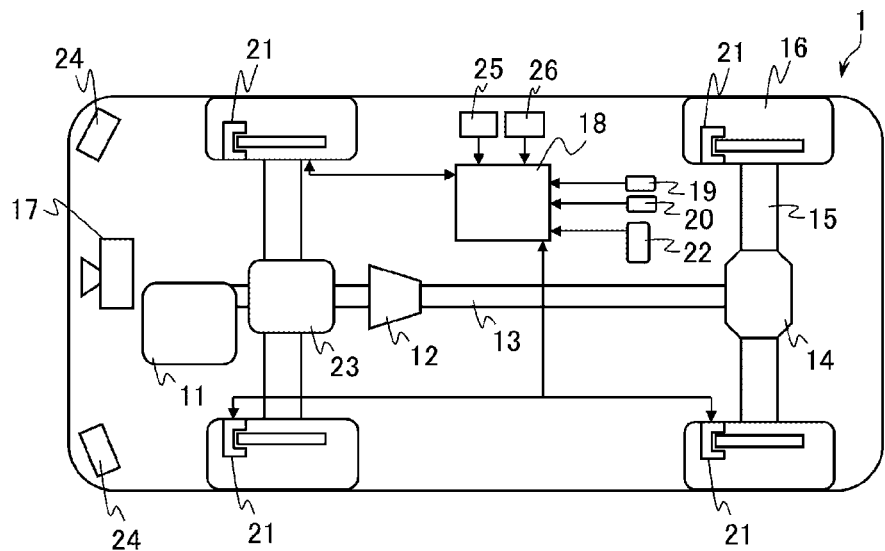
FIG. 1 shows an overall configuration view of a vehicle 1 including a vehicle control device 18 according to a first embodiment of the present invention.

FIG. 1 shows an overall configuration view of a vehicle 1 provided with the vehicle control device 18 according to the first embodiment.

The vehicle 1 shown in FIG. 1 is a rear wheel drive vehicle having a general configuration and including, for example, a cylinder injection gasoline engine 11 as a power source for traveling, an automatic transmission 12 capable of contacting with and separating from the engine 11, a propeller shaft 13, a differential gear 14, a drive shaft 15, four wheels 16, a hydraulic brake 21 provided with a wheel speed sensor, and an electric power steering system 23. Further, the vehicle 1 includes an accelerator pedal 19, a brake pedal 20, and a steering wheel 22.

The vehicle 1 further includes the vehicle control device 18 that is responsible for controlling devices, actuators, and equipment and the like that are installed and deployed. The vehicle control device 18, and the devices including sensors, which will be described later, actuators, and equipment and the like are adapted to be able to exchange signals and data through LAN or CAN communication in the vehicle. The vehicle control device 18 obtains information on the outside of the own vehicle from sensors to be described later, and transmits command values for realizing control such as following a preceding vehicle, maintaining a center of white lines, and preventing deviation, to the engine 11, the brake 21, and the electric power steering system 23.

The vehicle 1 further includes a camera 17, a pair of front radars 24, an own vehicle position measurement device 25, and a communication device 26. The camera 17 is a stereo camera or the like that is disposed in a front part of the vehicle 1 and provided with a solid-state imaging device or the like that captures an external environment in front of the vehicle 1 to acquire image information. The pair of front radars 24 is disposed in a front part of the vehicle 1, and are laser radars, millimeter wave radars, or the like that receive reflected waves from a three-dimensional object that is present around the vehicle. A traveling state of a front obstacle and a front road environment are detected by the camera 17 and the front radar 24, and the detected information is supplied to the vehicle control device 18. Targets to be detected by the camera 17 and the front radar 24 are an inter-vehicle distance, a distance from a ground installation object, a presence of an object, a speed, an acceleration, and the like, and these correspond to the predetermined detection target.

The own vehicle position measurement device 25 measures own vehicle position information (latitude and longitude) on the basis of information obtained from a GPS, and supplies the measurement result to the vehicle control device 18.

The communication device 26 receives the detection result acquired by the device external to the own vehicle, through vehicle-to-vehicle communication/road-to-vehicle communication (C2X communication) and supplies the detection result to the vehicle control device 18. The detection result is an inter-vehicle distance, a distance from a ground installation object, a presence of an object, a curvature of a road, a speed, an acceleration, and the like. The communication device 26 can also transmit an abnormality determination result determined by the vehicle control device 18, to a device external to the own vehicle.

Note that the vehicle 1 in FIG. 1 is an example of a vehicle to which the present embodiment can be applied, and does not limit a configuration of a vehicle to which the present embodiment can be applied. For example, a vehicle employing a continuously variable transmission (CVT) instead of the automatic transmission 12 may be used. In addition, while the camera 17 and the radar 24 are used as two external recognition sensors, two sensors with an overlapping detection range are sufficient.

Next, with reference to FIG. 2, a description will be given to a method for the vehicle control device 18 to acquire information on a predetermined detection target from a device external to the own vehicle in the present embodiment.

Figure 2:
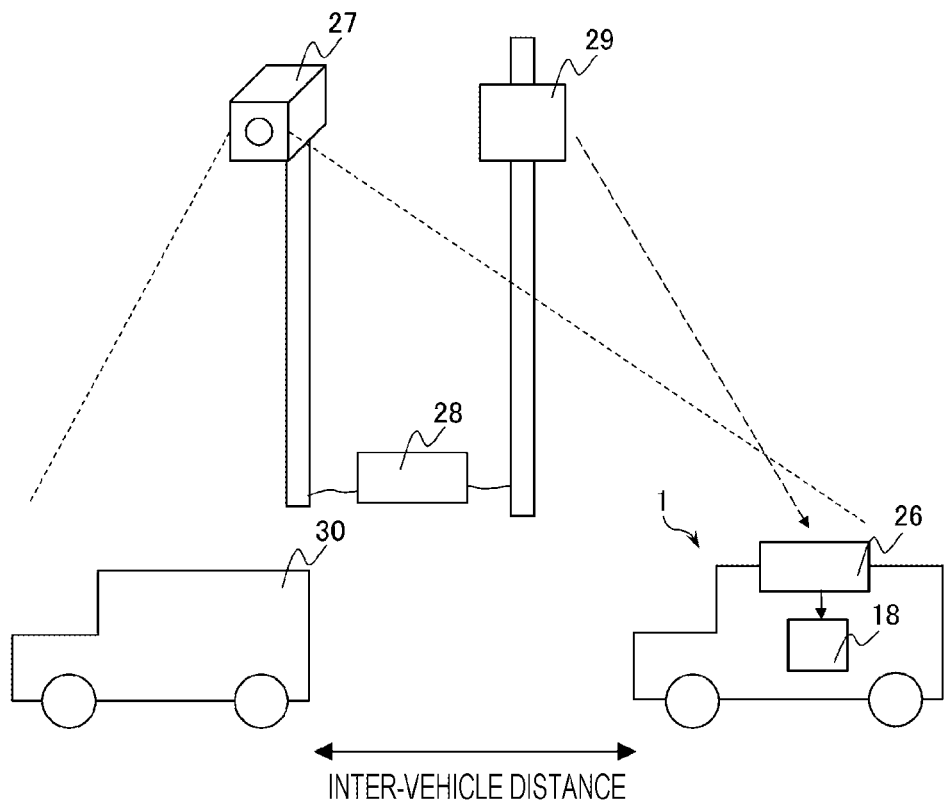
FIG. 2 shows an explanatory view of a method for the vehicle control device to acquire information on a predetermined detection target from a device external to an own vehicle in the first embodiment of the present invention.

FIG. 2 shows an explanatory view of a method for the vehicle control device 18 to acquire information on a predetermined detection target from a device external to the own vehicle in the present embodiment.

In FIG. 2, a method of acquiring an inter-vehicle distance from a road-to-vehicle communication device 29, which is a device external to the own vehicle, will be described. In FIG. 2, it is assumed that the vehicle (own vehicle) 1 is performing preceding vehicle follow-up for following a preceding vehicle 30. An on-road camera 27 installed along a road captures the vehicle and the preceding vehicle 30 as an image, and measures an inter-vehicle distance between the vehicle 1 and the preceding vehicle 30 in an image processing device 28. Information on the measured inter-vehicle distance is transmitted by the road-to-vehicle communication device 29, and the communication device 26 of the vehicle 1 receives the information. In this manner, the communication device 26 receives information on the inter-vehicle distance through road-to-vehicle communication with the road-to-vehicle communication device 29, which is the device external to the own vehicle.

Figure 3:
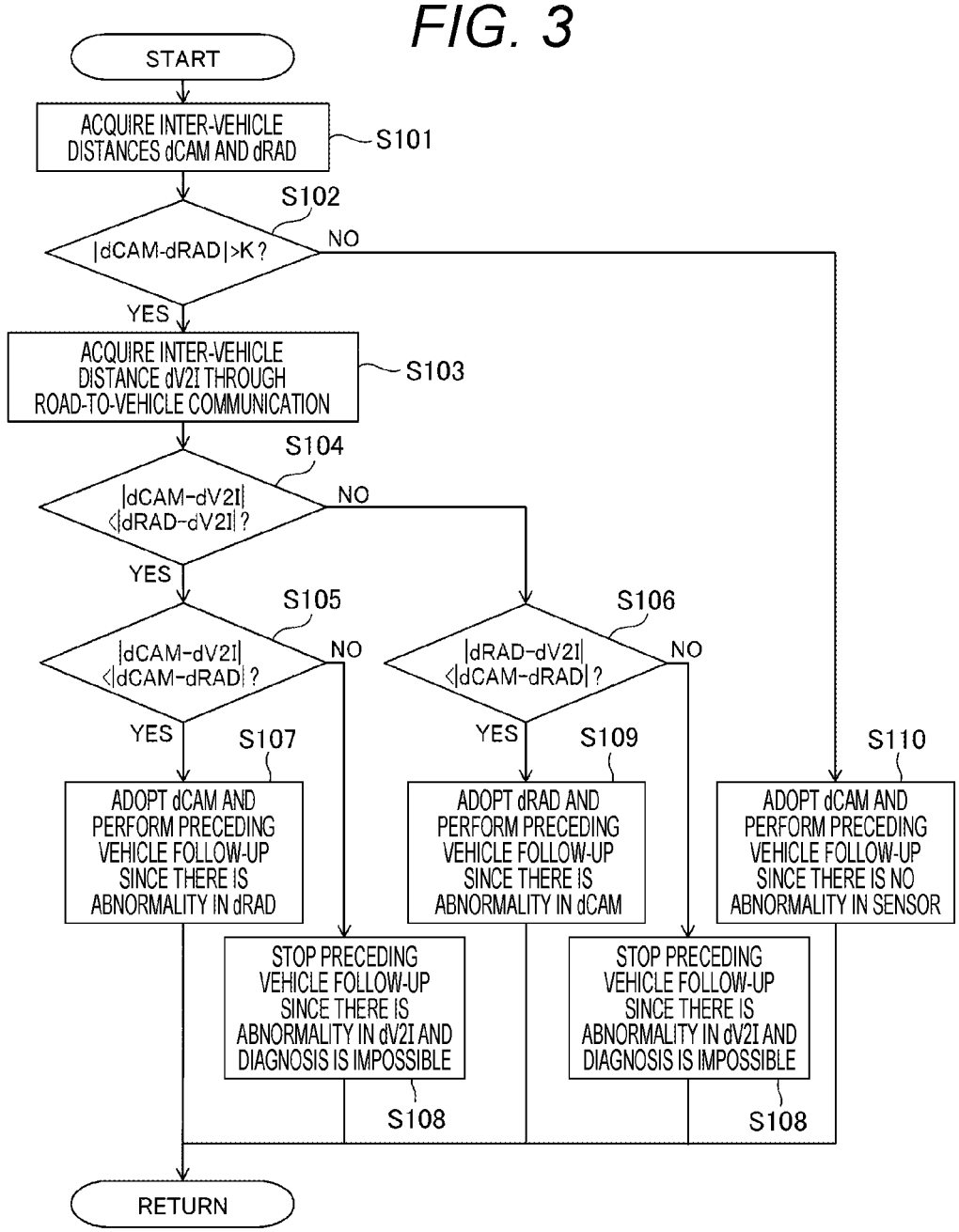
FIG. 3 shows a flowchart of a sensor abnormality determination process executed by the vehicle control device in the first embodiment of the present invention.

Next, a sensor abnormality determination process executed by the vehicle control device 18 according to the present embodiment will be described with reference to FIG. 3. In FIG. 3, a description is given to a process of determining an abnormality of the camera 17 and the radar 24 on the basis of an inter-vehicle distance when the vehicle 1 is performing preceding vehicle follow-up. Note that the vehicle control device 18 corresponds to first acquisition means, second acquisition means, and abnormality determination means.

FIG. 3 shows a flowchart of the sensor abnormality determination process executed by the vehicle control device 18 in the present embodiment.

The vehicle control device 18 receives inter-vehicle distances dCAM and dRAD between with the preceding vehicle 30 detected by the camera 17 and the radar 24 corresponding to the plurality of sensors (step S101). The vehicle control device 18 determines whether or not an absolute value of a difference between the two inter-vehicle distances dCAM and dRAD is larger than a predetermined threshold value K (step S102). When the absolute value is equal to or smaller than the threshold value K (step S102: NO), the vehicle control device 18 continues the preceding vehicle follow-up control by using the inter-vehicle distance dCAM (step S110). That is, it is regarded that there is no abnormality in the camera 17 and the radar 24. Note that the threshold value K is a distance with which a difference between the inter-vehicle distances can be regarded to be a sufficiently small, and is set on the basis of a performance and the like of each sensor.

When the absolute value of the difference between the inter-vehicle distances dCAM and dRAD is larger than the threshold value K (step S102: YES), the vehicle control device 18 acquires an inter-vehicle distance dV2I between the vehicle 1 and the preceding vehicle 30 calculated by the on-road camera 27 and the image processing device 28, through road-to-vehicle communication via the road-to-vehicle communication device 29 and the communication device 26 (step S103). That is, it is regarded that there is an abnormality in either one of the camera 17 and the radar 24, and the inter-vehicle distance detected by the device external to the own vehicle is acquired in order to determine the abnormality of the sensor.

The vehicle control device 18 determines whether or not an absolute value of a difference between the inter-vehicle distances dCAM and dV2I is smaller than an absolute value of a difference between the inter-vehicle distances dRAD and dV2I (step S104). When the absolute value of the difference between the inter-vehicle distances dCAM and dV2I is smaller (step S104: YES), the vehicle control device 18 further determines whether or not the absolute value of the difference between the inter-vehicle distances dCAM and dV2I is smaller than the absolute value of the difference between the inter-vehicle distances dCAM and dRAD (step S105).

When the absolute value of the difference between the inter-vehicle distances dCAM and dV2I is smaller than the absolute value of the difference between the inter-vehicle distances dCAM and dRAD (step S105: YES), the vehicle control device 18 adopts the inter-vehicle distance dCAM as the inter-vehicle distance of preceding vehicle follow-up, and continues the preceding vehicle follow-up (step S107). That is, since the inter-vehicle distance dRAD is the farthest value from the other inter-vehicle distances dCAM and dV2I as a result of the determination in steps S104 and S105, it is regarded that the inter-vehicle distance dRAD indicates an abnormal value and there is an abnormality in the radar 24.

Whereas, when the absolute value of the difference between the inter-vehicle distances dCAM and dV2I is equal to or larger than the absolute value of the difference between the inter-vehicle distances dRAD and dV2I (step S104: NO), the vehicle control device 18 determines whether or not the absolute value of the difference between the inter-vehicle distances dRAD and dV2I is smaller than the absolute value of the difference between the inter-vehicle distances dCAM and dRAD (step S106).

When the absolute value of the difference between the inter-vehicle distances dRAD and dV2I is smaller than the absolute value of the difference between the inter-vehicle distances dCAM and dRAD (step S106: YES), the vehicle control device 18 adopts the inter-vehicle distance dRAD as the inter-vehicle distance of preceding vehicle follow-up, and continues the preceding vehicle follow-up (step S109). That is, since the inter-vehicle distance dCAM is the farthest value from the other inter-vehicle distances dRAD and dV2I as a result of the determination in steps S104 and S106, it is regarded that the inter-vehicle distance dCAM indicates an abnormal value and there is an abnormality in the camera 17.

In step S105 or step S106, when it is determined that the absolute value of the difference between the inter-vehicle distances dV2I and dCAM or the absolute value of the difference between the inter-vehicle distances dV2I and dRAD is equal to or larger than the absolute value of the difference between the inter-vehicle distances dCAM and dRAD, the inter-vehicle distance dV2I is regarded as an abnormal value, and in this case, the preceding vehicle follow-up control is stopped since it is not possible to specify which of the camera 17 and the radar 24 has an abnormality, and it is also not possible to specify an accurate inter-vehicle distance (step S108).

According to the vehicle control device 18 as described above, it is determined whether or not there is an abnormality in the camera 17 and the radar 24, on the basis of the inter-vehicle distance between with the preceding vehicle 30 detected by the camera 17 and the radar 24, and the inter-vehicle distance between the vehicle 1 and the preceding vehicle 30 calculated by the on-road camera 27 and the image processing device 28, which are devices external to the own vehicle.

According to this configuration, in addition to the inter-vehicle distance detected by the camera 17 and the radar 24, the inter-vehicle distance detected by the device external to the own vehicle is acquired, and the abnormality of the camera 17 and the radar 24 is determined. Therefore, it is possible to determine the abnormality of the camera 17 and the radar 24 by majority decision with the three inter-vehicle distances, without increasing the number of sensors in the vehicle 1, which is the own vehicle. Accordingly, abnormality determination of the camera 17 and the radar 24 becomes possible without increasing the cost.

Further, since the vehicle control device 18 performs the abnormality determination process by using the inter-vehicle distance acquired through road-to-vehicle communication, it is possible to easily acquire the inter-vehicle distance from the device external to the own vehicle without increasing the cost, and it is possible to perform the abnormality determination process by majority decision.

Further, since the detection target of the camera 17 and the radar 24 is the inter-vehicle distance, it is possible to easily acquire from data detected by the camera 17 and the radar 24, and abnormality determination of the camera 17 and the radar 24 can be performed.

Further, when a difference of inter-vehicle distances between with the preceding vehicle 30 detected by the camera 17 and the radar 24 is equal to or smaller than a predetermined threshold value, the vehicle control device 18 determines that there is no abnormality in the camera 17 and the radar 24. Whereas, when the difference is larger than the predetermined threshold value, the vehicle control device 18 determines the abnormality of the camera 17 and the radar 24 on the basis of the inter-vehicle distances detected by the camera 17 and the radar 24 and the inter-vehicle distance detected by the device external to the own vehicle. As described above, when the difference between the inter-vehicle distances detected by the camera 17 and the radar 24 is equal to or less than a predetermined threshold value, it is determined that there is no abnormality in the camera 17 and the radar 24. Therefore, the abnormality determination process can be terminated at an early stage, and preceding vehicle follow-up can be performed by a normal sensor.

Further, when the vehicle 1 is preforming preceding vehicle follow-up on the preceding vehicle 30, the vehicle control device 18 determines whether or not there is an abnormality in a plurality of sensors. Therefore, it is possible to detect an abnormality in the sensor in performing preceding vehicle follow-up, and prevent preceding vehicle follow-up in an abnormal state of the sensor.

Next, a vehicle control device 18 according to a second embodiment of the present invention will be described with reference to FIGS. 4 and 5.

First, with reference to FIG. 4, a description will be given to a method for the vehicle control device 18 to acquire information on a predetermined detection target from a device external to an own vehicle in the present embodiment.

Figure 4:
FIG. 4 shows an explanatory view of a method for a vehicle control device to acquire information on a predetermined detection target from a device external to an own vehicle in a second embodiment of the present invention.

FIG. 4 shows an explanatory view of a method for the vehicle control device 18 to acquire information on a predetermined detection target from the device external to the own vehicle in the present embodiment.

In FIG. 4, a method of acquiring an inter-vehicle distance from a preceding vehicle 30, which is the device external to the own vehicle, will be described. In FIG. 4, it is assumed that a vehicle (own vehicle) 1 is performing preceding vehicle follow-up for following the preceding vehicle 30. The preceding vehicle 30 includes an own vehicle position measurement device 31 similar to an own vehicle position measurement device 25 of the vehicle 1, and a communication device 32 similar to a communication device 26 of the vehicle 1. The preceding vehicle transmits own vehicle position information (latitude and longitude) measured by the own vehicle position measurement device 31, to the vehicle 1 by the communication device 32. The communication device 26 of the vehicle 1 receives the own vehicle position information from the communication device 32 of the preceding vehicle 30, and transmits to the vehicle control device 18. In this manner, the communication device 26 receives information on the inter-vehicle distance through vehicle-to-vehicle communication with the communication device 32 of the preceding vehicle 30, which is the device external to the own vehicle. Then, the vehicle control device 18 calculates an inter-vehicle distance dV2V on the basis of the own vehicle position information of the preceding vehicle 30 and own vehicle position information of the vehicle 1.

Next, a sensor abnormality determination process executed by the vehicle control device 18 according to the present embodiment will be described with reference to FIG. 5. In FIG. 5, a description is given to a process of determining an abnormality of a camera 17 and a radar 24 on the basis of an inter-vehicle distance when the vehicle 1 is performing preceding vehicle follow-up.

Figure 5:
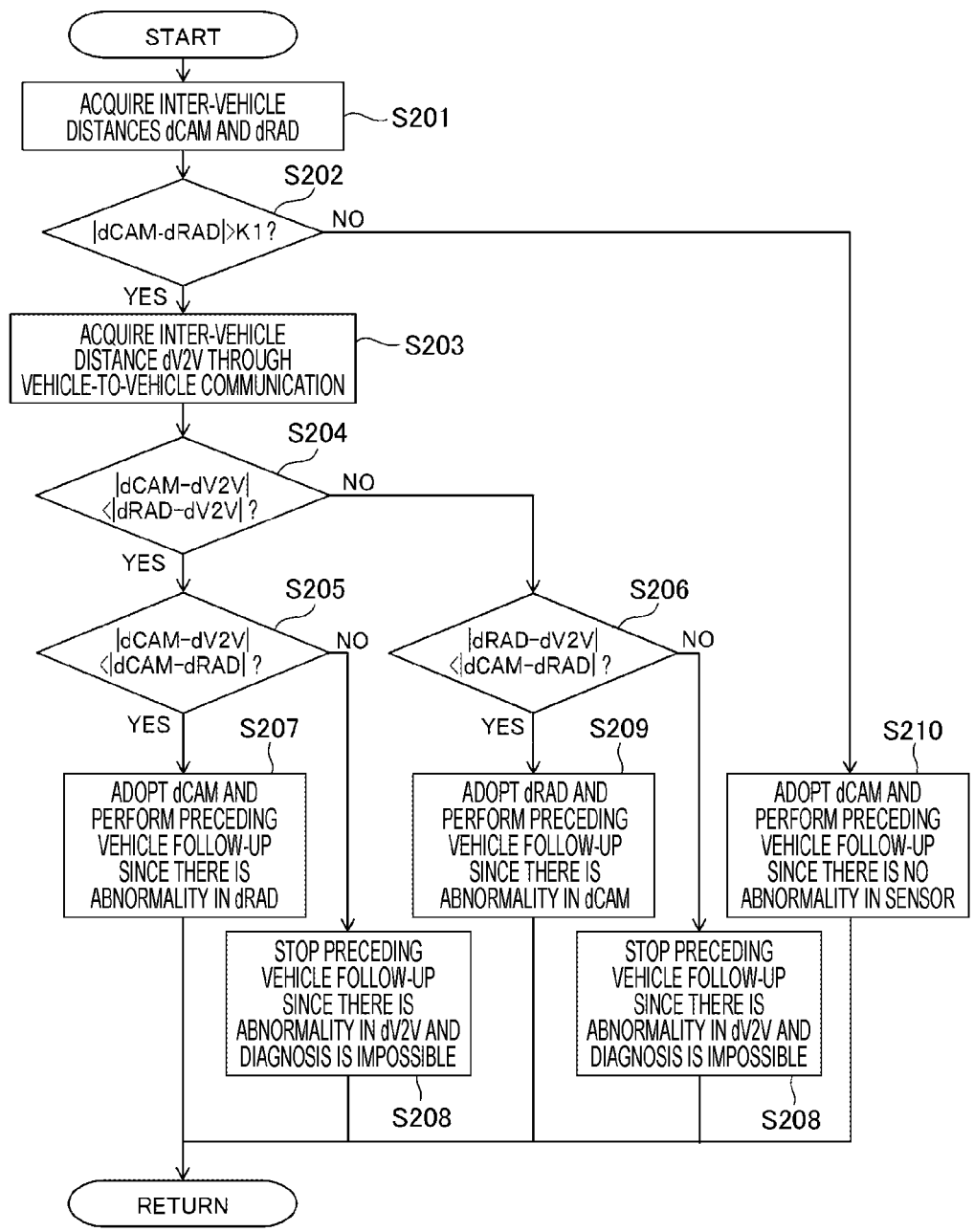
FIG. 5 shows a flowchart of a sensor abnormality determination process executed by the vehicle control device in the second embodiment of the present invention.

FIG. 5 shows a flowchart of the sensor abnormality determination process executed by the vehicle control device 18 in the present embodiment.

The vehicle control device 18 receives inter-vehicle distances dCAM and dRAD between with the preceding vehicle 30, detected by the camera 17 and the radar 24 corresponding to the plurality of sensors (step S201). The vehicle control device 18 determines whether or not an absolute value of a difference between the two inter-vehicle distances dCAM and dRAD is larger than a predetermined threshold value K1 (step S202). When the absolute value is equal to or smaller than the threshold value K1 (step S202: NO), the vehicle control device 18 continues the preceding vehicle follow-up control by using the inter-vehicle distance dCAM (step S210). That is, it is regarded that there is no abnormality in the camera 17 and the radar 24. Note that the threshold value K is a distance with which a difference between the inter-vehicle distances can be regarded to be a sufficiently small, and is set on the basis of a performance and the like of each sensor.

When the absolute value of the difference between the inter-vehicle distances dCAM and dRAD is larger than the threshold value K1 (step S202: YES), the vehicle control device receives own vehicle position information of the preceding vehicle 30 by the communication device 26 through vehicle-to-vehicle communication, measures the inter-vehicle distance dV2V between the vehicle 1 and the preceding vehicle 30, and acquires the inter-vehicle distance dV2V (step S203). That is, it is regarded that there is an abnormality in either one of the camera 17 and the radar 24, and the inter-vehicle distance is acquired on the basis of information detected by the device external to the own vehicle in order to determine the abnormality of the sensor.

The vehicle control device 18 determines whether or not an absolute value of a difference between the inter-vehicle distance dCAM and dV2V is smaller than an absolute value of a difference between the inter-vehicle distance dRAD and dV2V (step S204). When the absolute value of the difference between the inter-vehicle distances dCAM and dV2V is smaller (step S204: YES), the vehicle control device 18 further determines whether or not the absolute value of the difference between the inter-vehicle distances dCAM and dV2V is smaller than the absolute value of the difference between the inter-vehicle distances dCAM and dRAD (step S205).

When the absolute value of the difference between the inter-vehicle distances dCAM and dV2V is smaller than the absolute value of the difference between the inter-vehicle distances dCAM and dRAD (step S205: YES), the vehicle control device 18 adopts the inter-vehicle distance dCAM as the inter-vehicle distance of preceding vehicle follow-up, and continues the preceding vehicle follow-up (step S207). That is, since the inter-vehicle distance dRAD is the farthest value from the other inter-vehicle distances dCAM and dV2V as a result of the determination in steps S204 and S205, it is regarded that the inter-vehicle distance dRAD indicates an abnormal value and there is an abnormality in the radar 24.

Whereas, when the absolute value of the difference between the inter-vehicle distances dCAM and dV2V is equal to or larger than the absolute value of the difference between the inter-vehicle distances dRAD and dV2V (step S204: NO), the vehicle control device 18 determines whether or not the absolute value of the difference between the inter-vehicle distances dRAD and dV2V is smaller than the absolute value of the difference between the inter-vehicle distances dCAM and dRAD (step S206).

When the absolute value of the difference between the inter-vehicle distances dRAD and dV2V is smaller than the absolute value of the difference between the inter-vehicle distances dCAM and dRAD (step S106: YES), the vehicle control device 18 adopts the inter-vehicle distance dRAD as the inter-vehicle distance of preceding vehicle follow-up, and continues the preceding vehicle follow-up (step S209). That is, since the inter-vehicle distance dCAM is the farthest value from the other inter-vehicle distances dRAD and dV2V as a result of the determination in steps S204 and S206, it is regarded that the inter-vehicle distance dCAM indicates an abnormal value and there is an abnormality in the camera 17.

In step S205 or step S206, when it is determined that the absolute value of the difference between the inter-vehicle distances dV2V and dCAM or the absolute value of the difference between the inter-vehicle distances dV2V and dRAD is equal to or larger than the absolute value of the difference between the inter-vehicle distances dCAM and dRAD, the inter-vehicle distance dV2V is regarded as an abnormal value, and in this case, the preceding vehicle follow-up control is stopped since it is not possible to specify which of the camera 17 and the radar 24 has an abnormality, and it is also not possible to specify an accurate inter-vehicle distance (step S208).

The vehicle control device 18 according to the present embodiment can also achieve effects similar to those of the vehicle control device 18 according to the first embodiment.

It should be noted that the present invention is not limited to the above-described embodiments. Those skilled in the art can make various additions and modifications within the scope of the present invention.

For example, in the above embodiments, the detection target is an inter-vehicle distance between with the preceding vehicle, but a distance between the vehicle 1 and a ground installation object (for example, a road sign), a presence of an object, a curvature of a road, a speed of the vehicle 1, an acceleration of the vehicle 1, or a car width of the preceding vehicle 30 may be used. In a case where the detection target is a distance between the vehicle 1 and a ground installation object, the information on the predetermined detection target received by the vehicle 1 from the device external to the own vehicle is the distance between the preceding vehicle 30 and the ground installation object and own vehicle position information of the preceding vehicle 30. In a case where the detection target is a presence of an object, whether there is an object or not is detected by the camera 17 and the radar 24. A case where the detection target is a curvature of a road is a case where two cameras are installed in front of the vehicle 1.

Further, in the above embodiments, an inter-vehicle distance is calculated by the camera 17 and the radar 24, and the calculated inter-vehicle distance is transmitted to the vehicle control device 18. However, data acquired by the camera 17 and the radar 24 may be transmitted to the vehicle control device 18, and the inter-vehicle distance may be calculated by the vehicle control device 18 on the basis of the data.

REFERENCE SIGNS LIST 17 camera
18 vehicle control device
24 radar
25 own vehicle position measurement device
26 communication device
27 on-road camera
28 image processing device
29 road-to-vehicle communication device
30 preceding vehicle
31 own vehicle position measurement device
32 communication device

The invention claimed is:

1. A vehicle control device for a vehicle including a plurality of sensors having at least a first type and a second type, the plurality of sensors configured to detect a predetermined detection target; and communication device configured to communicate with outside via a network, the vehicle control device comprising:

an input/output device; and a processor communicatively coupled to the input/output device, wherein the processor is configured to:

acquire first information on the predetermined detection target from each of the plurality of sensors;

acquire second information on the predetermined detection target, the second information being detected by a device external to an own vehicle and received by the communication device; and determine whether or not there is an abnormality in the plurality of sensors, based on the first information and the second information on a condition that a detection result of the predetermined detection target is equal to or less than a predetermined threshold value, determine there is no abnormality in the plurality of sensors, wherein the detection result is a difference between a distance based on the first information from the first type and a second distance based on the first information from the second type, on a condition that the detection result is greater than the predetermined threshold value, calculate a second difference between the distance and the second information, calculate a third difference between the second distance and the second information, on a condition that the second difference is less than the third difference, determine there is an abnormality in at least one of the second type and the second information, and on a condition that the second difference is greater than or equal to the third difference, determine there is an abnormality in at least one of the first type and the second information, wherein when there is the abnormality in the second information, the processor stops a preceding vehicle follow-up, wherein when there is the abnormality in the second type, the processor uses only the first information acquired from the first type to perform the preceding vehicle follow-up, and wherein when there is the abnormality in the first type, the processor uses only the first information acquired from the second type to perform the preceding vehicle follow-up.

2. The vehicle control device according to claim 1, wherein the processor obtains information from the device external to the own vehicle through vehicle-to-vehicle communication or road-to-vehicle communication.

3. The vehicle control device according to claim 1, wherein the predetermined detection target is at least one of an inter-vehicle distance between the vehicle and a preceding vehicle, a distance between the vehicle and a ground installation object, a presence of an object, a curvature of a road, a speed of the vehicle, an acceleration of the vehicle, and a car width of the preceding vehicle.

4. The vehicle control device according to claim 1, wherein the processor determines whether the abnormality in the plurality of sensors is present when the vehicle is performing preceding vehicle follow-up on a preceding vehicle.

5. The vehicle control device according to claim 1, wherein on a condition that the second difference is less than the third difference, determine if the second difference is less than the detection result, and on a condition that the second difference is less than the detection result, determine there is the abnormality in the second type and use only the first information acquired from the first type, and on a condition that the second difference is greater than or equal to the detection result, determine there is the abnormality in the second information and stop the preceding vehicle follow-up.

6. The vehicle control device according to claim 1, wherein on a condition that the second difference is greater than or equal to the third difference, determine if the third difference is less than the detection result, and on a condition that the third difference is less than the detection result, determine there is the abnormality in the first, type and use only the first information acquired from the second type, and on a condition that the third difference is greater than or equal to the detection result, determine there is the abnormality in the second information and stop the preceding vehicle follow-up.

* * * * *